(12) United States Patent
Moyerson

(10) Patent No.: US 7,139,725 B1
(45) Date of Patent: Nov. 21, 2006

(54) METHOD OF OFFERING FREE PRODUCTS OR SERVICES OVER THE INTERNET

(76) Inventor: Jean-Francois Moyerson, 31, Avenue, Princesse Grace, MC-9800 (MC)

( * ) Notice: Subject to any disclaimer, the term of this patent is extended or adjusted under 35 U.S.C. 154(b) by 435 days.

(21) Appl. No.: 09/656,299

(22) Filed: Sep. 6, 2000

Related U.S. Application Data

(60) Provisional application No. 60/204,801, filed on May 16, 2000.

(51) Int. Cl.
*G06F 17/60* (2006.01)

(52) U.S. Cl. ............................ 705/14; 705/26; 705/27; 705/40; 463/25

(58) Field of Classification Search ................ 705/14, 705/26, 27, 40
See application file for complete search history.

(56) References Cited

U.S. PATENT DOCUMENTS

| | | | | |
|---|---|---|---|---|
| 4,982,346 A | * | 1/1991 | Girouard et al. ............. 364/550 |
| 5,080,364 A | * | 1/1992 | Seidman ..................... 273/138 |
| 5,551,692 A | * | 9/1996 | Pettit et al. ............. 273/143 R |
| 5,592,378 A | * | 1/1997 | Cameron et al. ........... 395/227 |
| 5,732,400 A | * | 3/1998 | Mandler et al. .............. 705/26 |
| 5,774,870 A | * | 6/1998 | Storey ......................... 705/14 |
| 5,809,481 A | * | 9/1998 | Baron et al. .................. 705/14 |
| 5,832,459 A | * | 11/1998 | Cameron et al. ............. 705/26 |
| 5,839,117 A | * | 11/1998 | Cameron et al. ............. 705/27 |
| 5,855,514 A | * | 1/1999 | Kamille ...................... 463/17 |
| 5,931,467 A | * | 8/1999 | Kamille ...................... 273/139 |
| 6,018,718 A | * | 1/2000 | Walker et al. ................ 705/14 |
| 6,061,660 A | * | 5/2000 | Eggleston et al. ............ 705/14 |
| 6,230,192 B1 | * | 5/2001 | Roberts et al. ............. 709/217 |
| 6,443,840 B1 | * | 9/2002 | Von Kohorn ................ 463/17 |
| 6,453,299 B1 | * | 9/2002 | Wendkos ..................... 705/14 |
| 6,464,583 B1 | * | 10/2002 | Kidron ........................ 463/25 |

FOREIGN PATENT DOCUMENTS

GB    0122040    * 8/1984

OTHER PUBLICATIONS

Creative Computers Leases 325,000 Square Foot Distribution Facility to Accommodate Growth; Secures $50 Million Line of Credit; Introduces Internet Worldwide Website and Online Catalog. Business Wire. p. 9250024, Sep. 1995.*

* cited by examiner

*Primary Examiner*—Hani M. Kazimi
*Assistant Examiner*—Stefano Karmis
(74) *Attorney, Agent, or Firm*—Abelman, Frayne & Schwab

(57) ABSTRACT

A system and method for offering free goods or services over computer networks allows a merchant to choose a probability-based method of selecting how the free items are determined. The probability of obtaining a free item for any item desired can also be displayed to a potential purchaser.

3 Claims, 13 Drawing Sheets

```
<!--
    Lucky Cycle
    March 2000
    JF MOYERSOEN

Data Entry Form
-->

<html>
<head>
    <title>Lucky Cycle</title>
</head>

<body>
<center>
<font face=verdana size=3><b>Lucky Cycle</b></font><b>
<form action="result.asp" method=post>
<!-- Display of an Error Message, followed by the initialisation of
this Error Message -->
<br><font face=verdana size=2>
Concept invented and registered by Jean-François Moyersoen
<p> </p>
    <table bgcolor="#E0E0E0" border=1 cellpadding=20 width="461">
      <tr><td>
            <font face=verdana size=2 color=red><i><%=
Session("error_message") %>
            <% Session("error_message") = "" %>
              <table width="419">
              <tr>
                    <td colspan=2><font face=verdana size=2><b>Selected
Algorithm :</b></font></td>
              </tr>
              <tr>
                    <td align=right width="162">
                    <input type=radio name="algorithm" value="1" <% If
Session("algorithm") = "1" then response.write(" checked ") %>></td>
                    <td width="245"><font face=verdana size=2>The
regular cycle</font></td>
              </tr>
              <tr>
                    <td align=right width="162">
                    <input type=radio name="algorithm" value="2" <% If
Session("algorithm") = "2" then response.write(" checked ") %>></td>
                    <td width="245"><font face=verdana size=2>The
constant probability</font></td>
              </tr>
              <tr>
                    <td align=right width="162">
                    <input type=radio name="algorithm" value="3" <% If
Session("algorithm") = "3" then response.write(" checked ") %>></td>
                    <td width="245"><font face=verdana size=2>The
pre-defined list</font></td>
              </tr>
              <tr>
                    <td align=right width="162">
                    <input type=radio name="algorithm" value="4" <% If
Session("algorithm") = "4" then response.write(" checked ") %>></td>
                    <td width="245"><font face=verdana size=2>The
dynamic probability</font></td>
```

FIG. 3

```
        </tr>
            <tr>
                <td colspan=2> </td>
            </tr>
            <tr>
                <td colspan=2><font face=verdana size=2><b>Parameters
:</b></font></td>
            </tr>
            <tr>
                <td width="162"><font face=verdana
size=2>Cycle</font></td>
                <td width="245"><font face=verdana size=2>n=
                <input type=text name="n" maxlength=3 size=3 value="<%=
Session("n") %>"></font></td>
            </tr>
            <tr>
                <td width="162"><font face=verdana size=2>Number of
purchases </font></td>
                <td width="245"><font face=verdana size=2>p=
                <input maxlength=4 type=text name="pmax" size=3
value="<%= Session("pmax") %>"></font></td>
            </tr>
            <tr>
                <td colspan=2> </td>
            </tr>
            <tr>
                <td colspan=2 align=center><input type=submit
value="Simulation"></td>
            </tr>
            </table>
</i></font></td></tr>
</table>
</font></form>
</b></center></body>
</html>
```

*FIG. 3A*

```
<!-- #include file="algorithm.inc" -->
<%
    '## Input of the form data if the form is not empty
    '## If this page is referred to by a page other than default.asp,
this form does not exist
    '## and the instruction bloc will not be executed
    If Request.form("n") <> "" or Request.Form("pmax") <> "" or
Request.Form("algorithm") <> "" Then
        Session("n") = Trim(Request.Form("n"))
        Session("pmax") = Trim(Request.Form("pmax"))
        Session("algorithm") = Trim(Request.Form("algorithm"))
    End If '## Verification of the selected algorithm
    If Session("algorithm") <> "1" and Session("algorithm") <> "2"
and Session("algorithm") <> "3" _
        and Session("algorithm") <> "4" Then Return_Error ("The
algorithm is not correct")

'## Verification if the value N has been entered
    If Session("n") = "" then Return_Error("N is empty")
    If not Isnumeric(Session("n")) then Return_Error("N is not a
number")
    If Cstr(CLng(Session("n"))) <> Session("n") then Return_Error("N
is not a whole number")
    If CLng(Session("n")) <= 0 Then Return_Error("N must be a
positive number")

'## Verification of the entered Pmax value
    If Session("pmax") = "" then Return_Error("Pmax is empty")
    If not Isnumeric(Session("pmax")) then Return_Error("Pmax is not
a number")
    If Cstr(CLng(Session("pmax"))) <> Session("pmax") then
Return_Error("Pmax is not a whole number")
    If CLng(Session("pmax")) <= 0 Then Return_Error("Pmax must be a
positive number")

'## Initialisation of the variables
    nb_articles_won = 0
    Randomize()

'## Return function to the previous page if an error occurs
    '## the Error Message is stored in the Session("Error_Message")
    Sub Return_Error(p_message)
        Session("Error_Message") = p_message
        response.buffer = true
        response.clear
        response.redirect("default.asp")
        response.end
    End Sub
```

FIG. 4

```
'## Display of the results table
    Sub Table()

'## Selected algorithm by the Session("algorithm")variable
        Select Case Session("algorithm")

'## For each algorithm, the index of the ordered article p
varies between 1 and Pmax
        '## For each value p, a function containing the Lucky Cycle
algorithm is called
        '## The parameters to be passed to these different
functions are the cycle n stored in the Session("n") and p
        '## The result is False if the ordered product is not given
for free and True if the product is a free gift '## The cell function displays a cell of the table
        '## The parameters to be passed are the index p to be
displayed inside the cell and
        '## the return value of the algorithm that will define the
background color of the cell
            Case "1" :       For p = 1 to Session("pmax")
                                    Cell p,
algorithm_1(Session("n"), p)
                             Next
            Case "2" :       For p = 1 to Session("pmax")
                                    Cell p,
algorithm_2(Session("n"), p)
                             Next
            Case "3" :       For p = 1 to Session("pmax")
                                    Cell p,
algorithm_3(Session("n"), p)
                             Next
            Case "4" :       For p = 1 to Session("pmax")
                                    Cell p,
algorithm_4(Session("n"), p)
                             Next End Select End Sub '## Display of the table cell with a result
    Sub Cell(index_p, reponse_algorithm)

'## If the cell is the first in a serie of 20, the
following end of line/begin of line tags will be inserted
            if index_p mod 20 = 1 then
                response.write("</tr><tr>")
            end if '## If the index corresponds to a free product, the
background and text color will be defined
            if reponse_algorithm = true then
                bg_color = "red"
                text_color = "white"
                '## The number of articles won is incremented
                nb_articles_won = nb_articles_won + 1
            else
                '## If the product is not offered for free, other colors
will be used for the display
```

FIG. 4A

```
                bg_color = "white"
                text_color = "black"
            end if '## Display of a cell
            response.write("<td align=center bgcolor='" & bg_color &
"'>" & _
                        "<font color='" & text_color & "' face=verdana
size=2>" & index_p & "</td>")

End Sub

%>
<html>
<head>
    <title>Lucky Cycle</title>
</head>

<body>
<table cellspacing=1 cellpadding=3>
<tr>
    <td colspan=20><font face=verdana size=2><b>Result
Table</b></font></td>
<% Call Table %>
</tr>
<tr>
    <td colspan=20><br><font face=verdana size=2><b><%=
nb_articles_won %> articles on <%= Session("pmax") %> have been won <%      '## If the number of articles is different from zero
            If nb_articles_won <> 0 Then %>
            (1 on <%= FormatNumber(Session("pmax")/nb_articles_won,3)
%>)
    <%      End If %>
    <br></b> Theoretical Cycle = <%= Session("n") %>
    <br><br>
    <form action=result.asp method=post>
    <input type=button value="Back"
onclick="document.location.href='default.asp'">
    <input type=submit value="New Simulation">
    </form>
    </font></td>
</tr>
</table>

</body>
</html>
```

Dim p_won    '## Variable storing the index of the next article that
will be offered free
                            '## (or that will be used as a reference for
the dynamic probability algorithm)

'## All the procedures use the parameters cycle n (cycle_n) and the
index p (index_p)
'## The result of each procedure is a boolean (True if the article is
given free or False in the other situation)
```

'## The regular cycle

```
'## is based on a fixed cycle : after (n-1) articles have been sold,
the nth article is offered free
'## Mathematically, it could be stated that the article is offered free
when
'## index_p Mod cycle_n = constant number between 0 and (n-1)
'## For example : if index_p Mod cycle_n = 0

Function Algorithm_1(cycle_n, index_p)
      If index_p Mod cycle_n = 0 Then
            Algorithm_1 = True
      Else
            Algorithm_1 = False
      End If
End Function
```

'## The constant probability

```
'## The cycle is based on a constant probability of 1/n
'## Mathematically, this cycle is characterized by the generation of a
random number between 0 and (n-1)
'## If this number equals any constant between 0 and (n-1), then the
article is offered free
'## For example, if the number is equal to 0

Function Algorithm_2(cycle_n, index_p)
      nb_random = Int(cycle_n * Rnd)
      If nb_random = 0 Then
            Algorithm_2 = True
      Else
            Algorithm_2 = False
      End If
End Function
```

FIG. 5

'## The pre-defined list

```
'## This cycle is characterized by the creation of a predefined list
with all the indexes p that will be future winners
'## This list will be created on regular intervals, depending on the
number of elements defined in the list
'## This list must itself respect the cycle n and as a result the
probability 1/n.
'## The algorithm underneath represents a special case in which the
list contains only one element
'## and is thus rebuild every time n articles have been ordered
'## In this situation, this list is created by randomly assigning a
number between index_p and index_p + cycle_n Function Algorithm_3(cycle_n, index_p)
      '## Creation of the list if the article of the index p begins
with a serie of n orders
      '## this means if the index_p mod cycle_n = 1
      '## Special case : if the cycle_n = 1 then no matter what the
value is of p,
      '## a list will be recreated (the article is the first of a serie
of 1 order), when p mod 1 <> 1
      If index_p mod cycle_n = 1 or cycle_n=1 Then
            p_won = index_p + Int(cycle_n * Rnd)
      End If
      '## If the index p is found in the list p_won containing a single
element, it will be offered free
      If index_p = p_won Then
            Algorithm_3 = True
      Else
            Algorithm_3 = False
      End If
End Function
```

'## The dynamic probability

```
'## This cycle calculates the probability of an order with index p in
function of a winning reference order,
'## that in this case would correspond to a regular cycle (see the
first algorithm)
'## The probability is calculated in function of the index_p and the
winning reference order
'## In the function underneath, we take as a reference list (n, 2*n,
3*n, 4*n, ...)
'## This list can contain any value as long as it respects itself the
cycle n and the probability 1/n Function Algorithm_4(cycle_n, index_p)
      '## Initialisation during the first passage of p_won = cycle_n
      If index_p = 1 Then
            p_won = cycle_n
      End If
      '## Calculation of the inverse of the probability
      '## In this case, we take (p_won - index_p + 1)
      Inv_probability = (p_won - index_p + 1)
      '## Generation of a random number between 0 and
(inv_probability -1)
      nb_random = Int(Inv_probability * Rnd)
      '## If the number is equal to 0, the product is offered free
      If nb_random = 0 Then
            Algorithm_4 = True
```

FIG. 5A

```
          '## The winning reference order takes the following index
of the reference list
          p_won = CInt(p_won) + CInt(cycle_n)
     Else
          Algorithm_4 = False
     End If
End Function
%>
```

FIG. 5B

METHOD OF OFFERING FREE PRODUCTS OR SERVICES OVER THE INTERNET

CROSS-REFERENCE TO RELATED APPLICATIONS

This application claims the benefit of the filing date of U.S. Provisional Application No. 60/204,801, filed on May 16, 2000.

BACKGROUND OF THE INVENTION

1. Field of the Invention

This invention relates to commerce conducted over the Internet and particularly to the offer of products or services for sale over the Internet.

2. Description of the Related Art

The purchase and sale of goods and services over the Internet by consumers has been growing at a rapid rate. Although there are many advantages to consumers in conducting such electronic commerce transactions, such as the low cost and speed of the transactions, the ease of employment of the Internet, the virtually unlimited range of products and services offered, the security of payments, and the anonymity of transactions, many consumers are still hesitant to purchase over the Internet due to privacy or security concerns, the novelty of the methods involved, or for many other unknown or not easily articulated reasons.

The subject invention offers an additional incentive to hesitant consumers to purchase over the Internet, besides the other advantages previously cited. The invention provides this incentive by allowing a consumer of goods or services to acquire those goods or services at no cost according to a random process, and the consumer can be notified, prior to an order, of the probability that he or she will receive the goods or services desired to be purchased at no cost.

Thus, for example, a consumer may be informed that if he wishes to purchase a particular book, every tenth book ordered will be delivered at no charge. Alternatively, the consumer may be informed that the number of books ordered before a free one is offered will be a random number. In addition, a consumer may be notified of the number of purchase orders placed for a particular good or service.

SUMMARY OF THE INVENTION

The invention comprises a method of offering free product(s) and/or service(s) over the Internet embodied by, for example, a computer software program for E-Commerce applications (hereinafter sometimes referred to as "LUCK(Y)CYCLE"). The program is an enhancement to existing merchant web-sites which would enable the merchant to offer free product(s) and/or service(s) to customers in accordance with pre-set parameters chosen by the merchant as part of his marketing strategy.

The software program comprises four user-definable algorithms allowing the merchant user to predict the probability of a free product and/or service being offered to the customer.

BRIEF DESCRIPTION OF THE DRAWINGS

FIGS. 3 and 3A are source code for the default LUCK(Y)CYCLE management screen available for each individual and/or (a) group(s) of product(s) and/or service(s) in an online store's catalog.

FIGS. 4, 4A, and 4B are source code for result screens for LUCK(Y)CYCLE showing the winning product(s) and/or service(s), depending on the merchant's choice of one of the four user-definable algorithms.

FIGS. 5, 5A, and 5B are source code for the four LUCK(Y)CYCLE user-definable algorithms.

DESCRIPTION OF THE PREFERRED EMBODIMENT(S)

E-Commerce and On-Line Shopping

Figure 1:
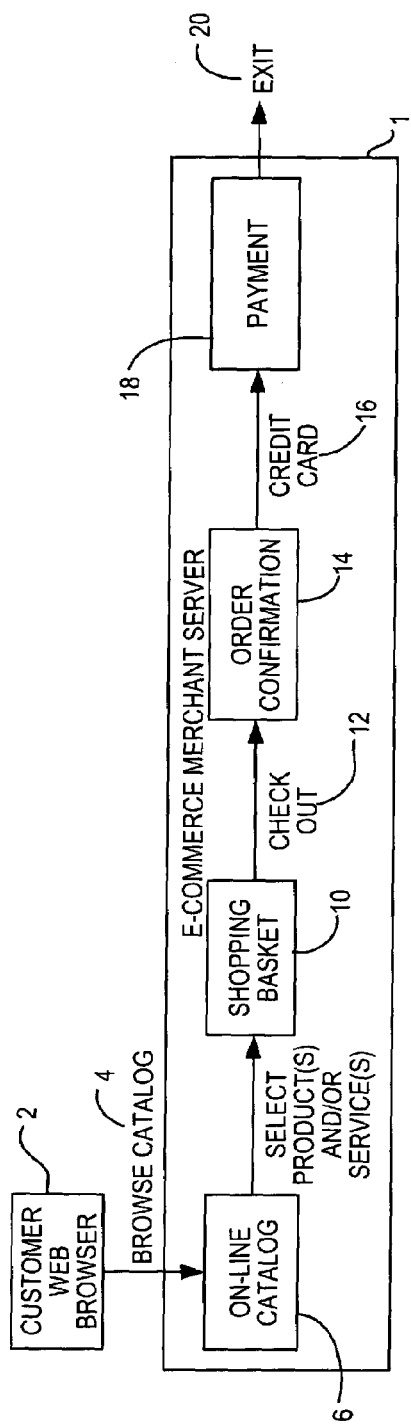
FIG. 1 is a flow chart of an Internet purchase transaction without the use of the subject invention.

E-commerce sites (such as Amazon.com for example) offer customers a large catalog of individual and/or (a) group(s) of products and/or services. As shown in FIG. 1, on arriving at the on-line shop 1 on the internet using a web browser 2, the customer may browse 4 through the range of products and/or services available for purchase in the on-line catalog 6, progressively select product(s) and/or service(s) for purchase 8, and add them to a virtual "shopping basket" 10 prior to payment 18 (via credit card 16) and exit 20 from the "store" 1.

Figure 2:
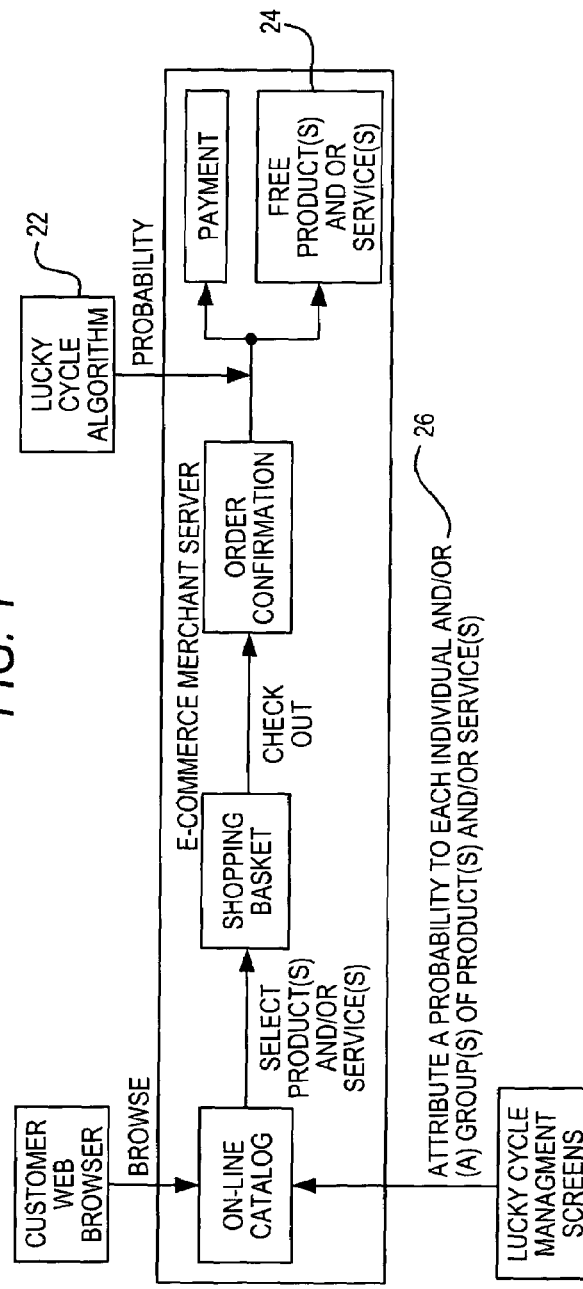
FIG. 2 is a flow chart of an internet purchase transaction utilizing the subject invention.

As shown in FIG. 2, with the addition of the LUCK(Y) CYCLE program 22 to an on-line store, the customer could be entitled to benefit from free offers, free products and/or services, etc. 24 in accordance with a strategy pre-defined by the merchant and regulated and managed by the Lucky Cycle program.

The LUCK(Y)CYCLE program will enable the merchant to attribute to each individual and/or (a) group(s) of product (s) and/or service(s) in his catalog individualized parameters which will decide the probability of a free gift of that individual and/or (a) group(s) of product(s) and/or service(s) 26 being offered to the customer.

How it Works

General Principle

Each individual and/or group of product(s) and/or service (s) can be characterized by its own algorithmic cycle which will define the statistical probability of it being offered free to the customer. This cycle is pre-defined by the merchant and represents an estimate of the number of items which should be sold in order that one item or group of items may be offered free.

Procedures activated at the moment of purchase of any item or group of items will enable the customer to see whether he receives it or them for free or whether he must pay for it or them.

In this application, the letter "n" will be used to represent the cycle selected by the merchant. The proposed algorithms will be based, amongst other things, on the number of catalog items of any given type ordered by the total number of customers visiting the site since its opening. Each catalog item ordered will thus have its own index, which is "p", and the cycle selected by the merchant is specific to each catalog item.

Example

Assume that an E-commerce site is offering two articles, A and B.

Article A has a cycle where n=10, which means that the probability of it being offered for free is 1/10 or 10%.

Article B has a cycle independent of article A, and which may be different from n=10.

The first article A has an index of p=1.

The second article A has an index of p=2.

The first article B has an index of p 1.

And so on . . .

Explanation of the Different Algorithms

The Regular Cycle

In this algorithm, after (n−1) articles have been sold, the nth article is offered for free. The probability is therefore a direct function of "p".

Mathematically, it could be stated that the article is offered for free when (p modulus n)=0.

This mathematical statement could be extended to a more general equation: (p modulus n)=whole number constant between 0 and (n−1). If we call the whole number constant c, this more general equation would describe the result that after c−1 articles have been sold, the cth article is offered for free for the first cycle, after n+c−1 articles have been sold, the (n+c)th article is offered for free for the second cycle, and so on.

The source code of the regular cycle principle is shown in FIG. 5 underneath the high-lighted regular cycle algorithm title.

Figure 6:
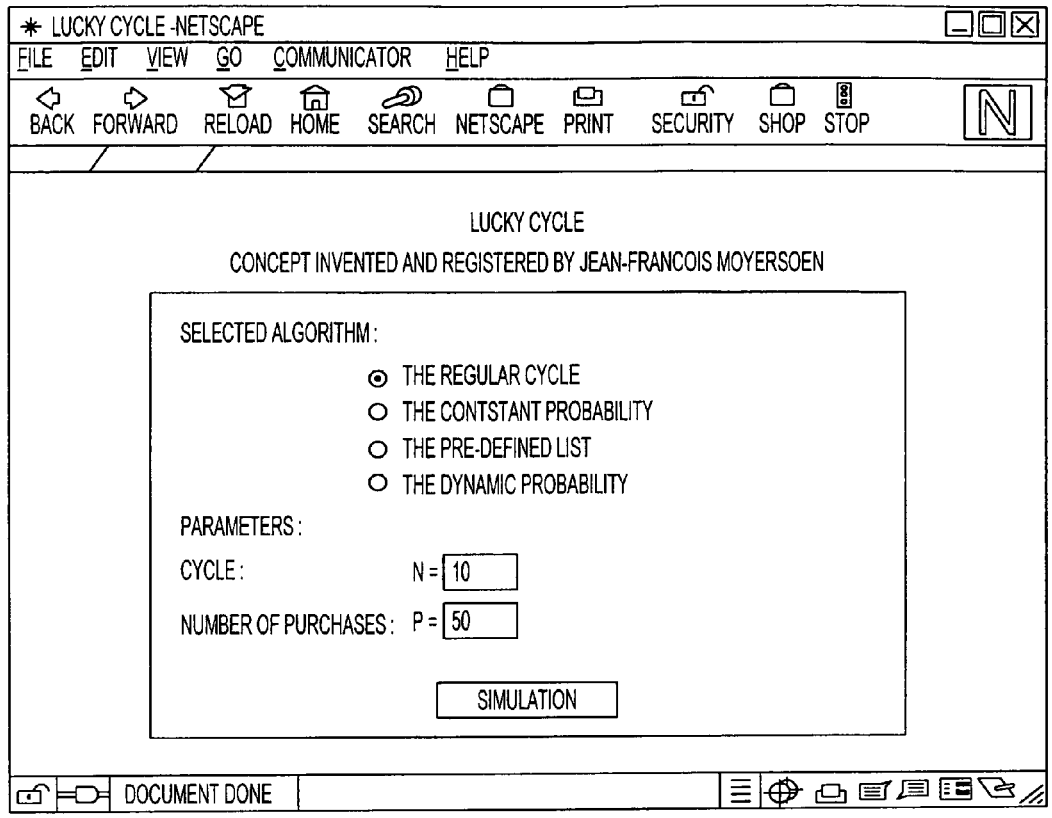
FIG. 6 shows a LUCK(Y)CYCLE management screen where the merchant has selected the regular cycle algorithm for a particular individual and/or (a) group(s) of product(s) and/or service(s) in the on-line store's catalog.
Figure 7:
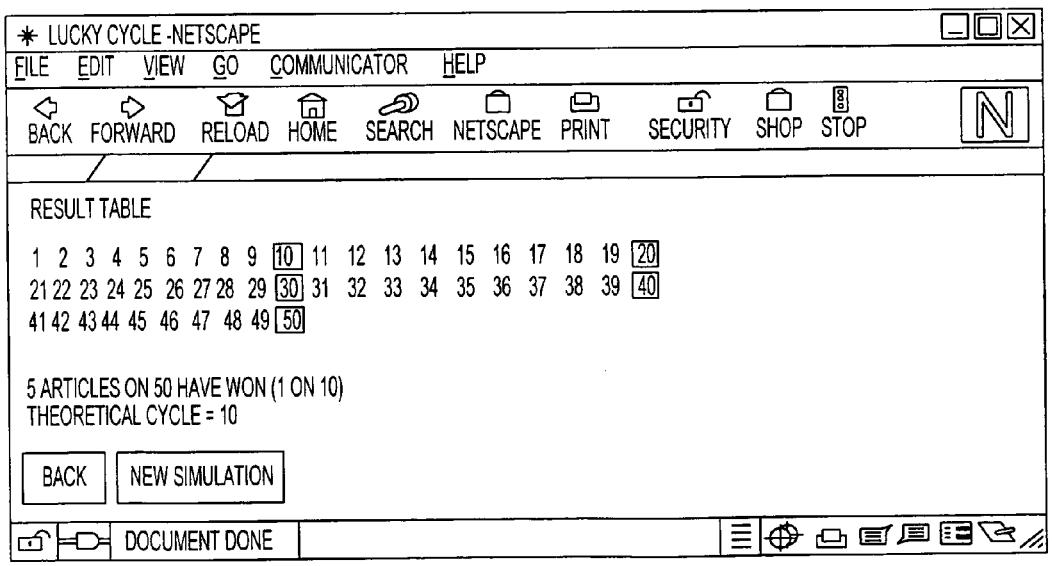
FIG. 7 shows a LUCK(Y)CYCLE result screen showing the individual and/or (a) group(s) of product(s) and/or service(s) offered for free corresponding to the merchant's choice of the regular cycle algorithm for a particular individual and/or (a) group(s) of product(s) and/or service(s) as shown in FIG. 6.

A screenshot in FIG. 6 shows how the merchant selects this algorithm. The screenshot in FIG. 7 shows the resulting individual and/or group of products and/or services offered for free when n has been set to 10 and p has been set to 50.

Example

The cycle where n=10 would mean that the 10th, the 20th, the 30th . . . etc . . . article ordered would be offered free to the customer.

The Constant Probability

This algorithm is characterized by an identical probability for all values of "p". For all orders placed for the article, each customer will have a 1/n probability of a free gift.

Mathematically, this cycle is characterized by the generation of a random number between 0 and (n−1). If this number equals 0 (or any other constant between 0 and (n−1)), then the article is offered for free.

The source code of the constant probability algorithm is shown in FIG. 5 underneath the highlighted constant probability algorithm title.

Figure 8:
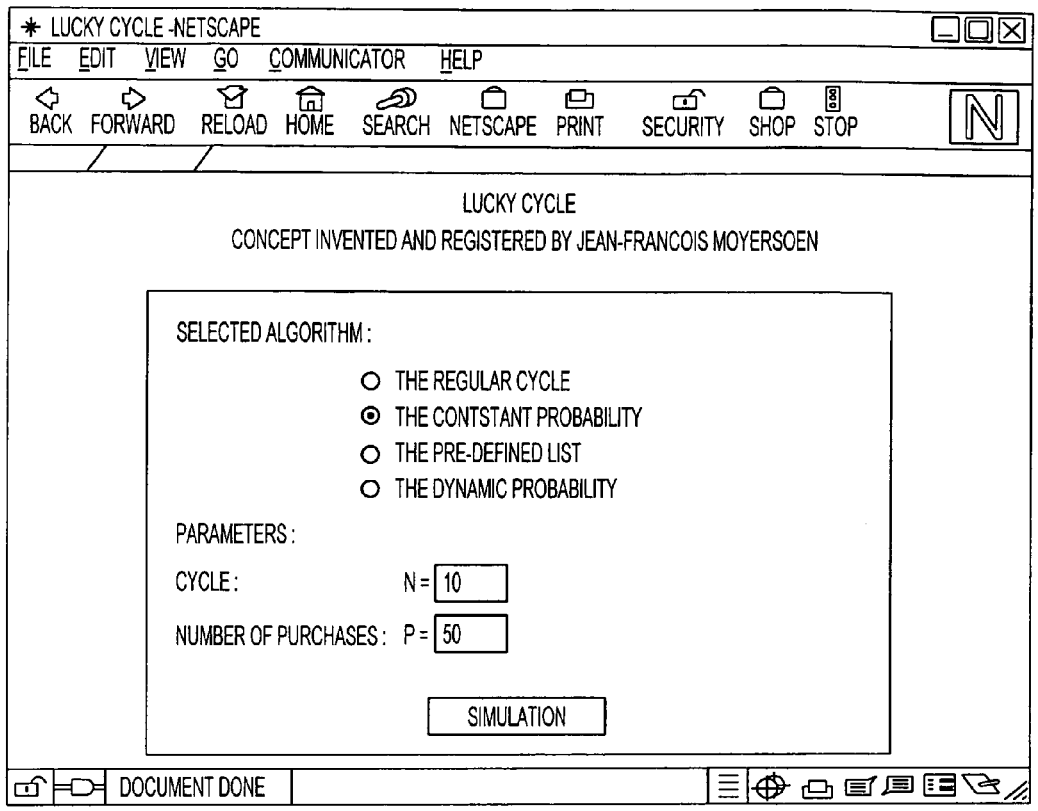
FIG. 8 shows a LUCK(Y)CYCLE management screen where the merchant has selected the constant probability algorithm for a particular individual and/or (a) group(s) of product(s) and/or service(s) in the on-line store's catalog.
Figure 9:
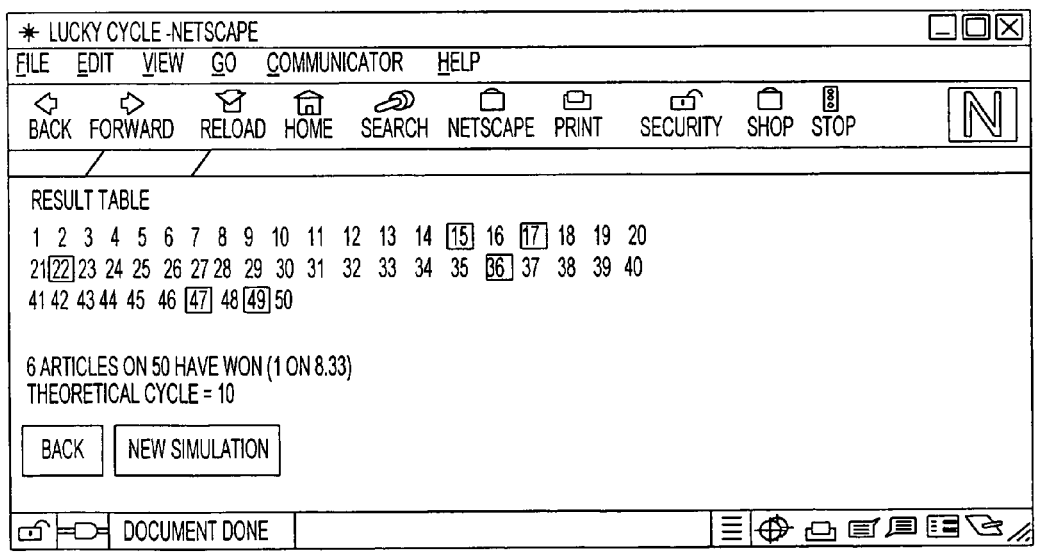
FIG. 9 shows a LUCK(Y)CYCLE result screen showing the individual and/or (a) group(s) of product(s) and/or service(s) offered for free corresponding to the merchant's choice of the constant probability algorithm for a particular individual and/or (a) group(s) of product(s) and/or service(s) as shown in FIG. 8.

A screenshot in FIG. 8 shows how the merchant selects this algorithm. FIG. 9 shows the resulting individual and/or group of products/services offered for free when n has been set to 10 and p has been set to 50.

Example

The cycle where n=10 would give all customers for this article a 1 in 10 chance of winning it for free.

The Pre-Defined List

This algorithm comprises determining at the opening of the site a series of whole numbers included between 1 and v which will determine future winners.

If the index "p" for any particular order corresponds to a number contained within this list, then the article is offered for free.

This list should therefore contain v/n numbers in order to respect the n cycle. When the v articles have been ordered, a new series of numbers must be created between v+1 and 2v.

This series of numbers may be created manually by the site administrator, or at random by a number generator.

Mathematically, v/n distinct numbers are generated with values between 1 and v. If "p" is included in this series, then the article is offered for free.

One particular case in this cycle is where v=n. In this case, the list is comprised of a single element. This "list" is recreated whenever "p" reaches a multiple of n and includes a number to be found between p and (p+n).

The source code of the pre-defined list algorithm is shown in FIGS. 5 and 5A underneath the highlighted pre-defined list algorithm title.

Figure 10:
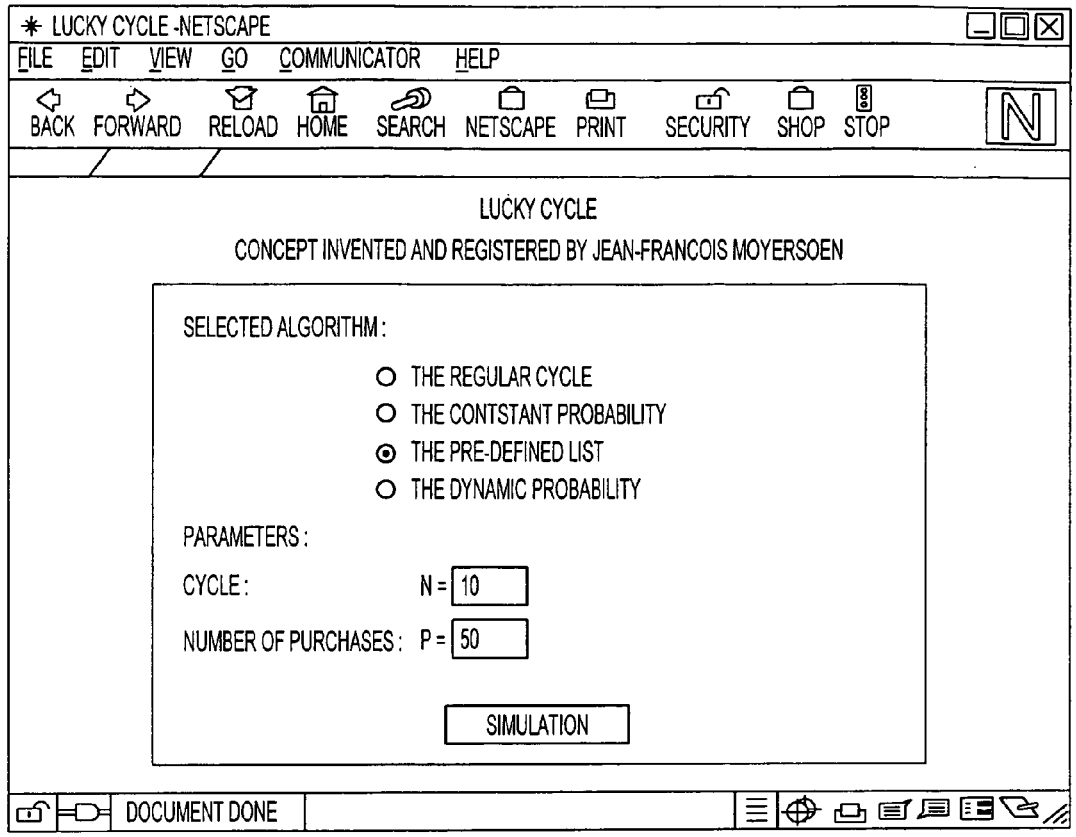
FIG. 10 shows a LUCK(Y)CYCLE management screen where the merchant has selected the pre-defined list algorithm for a particular individual and/or (a) group(s) of product(s) and/or service(s) in the on-line store's catalog.
Figure 11:
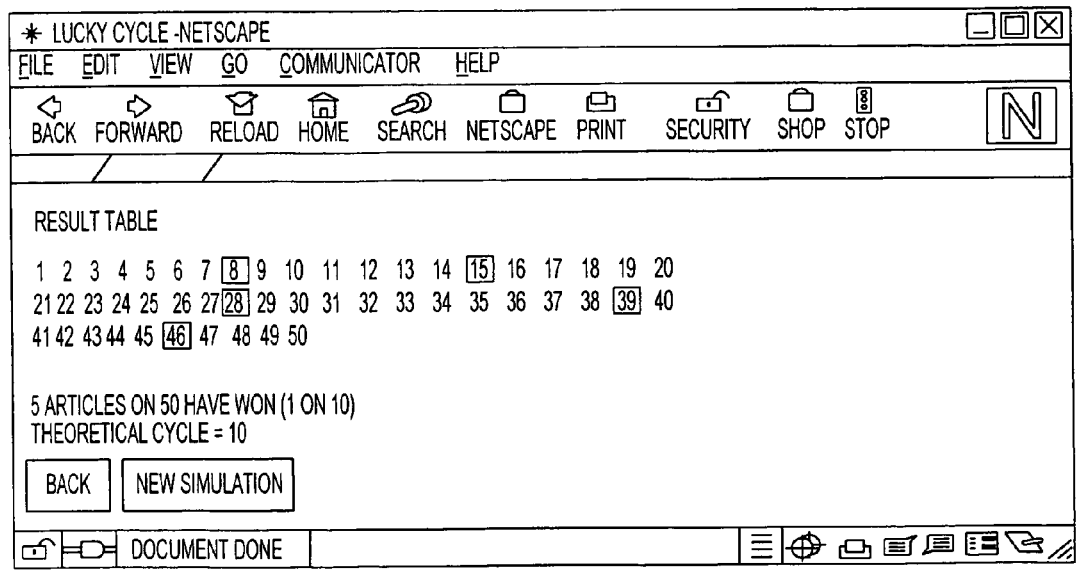
FIG. 11 shows a LUCK(Y)CYCLE result screen showing the individual and/or (a) group(s) of product(s) and/or service(s) offered for free corresponding to the merchant's choice of the pre-defined list algorithm for a particular individual and/or (a) group(s) of product(s) and/or service(s) as shown in FIG. 10.

A screenshot in FIG. 10 shows how the merchant selects this algorithm. FIG. 11 shows the resulting individual and/or group of products and/or services offered for free when is n has been set to 10 and p has been set to 50.

The Dynamic Probability

This algorithm calculates the probability of obtaining an article for free according to the difference between p and the next article to be found in a pre-defined reference list.

For example, assume a pre-defined reference list of a regular series such as: 10, 20, 30, 40, . . . corresponding to a regular cycle where n=10.

At the opening of the site, the next article in the reference list is thus 10. The first article ordered will have a probability of 1 in 10. The second article ordered will have a probability of 1 in 9. The third article ordered will have a probability of 1 in 8. If we assume that this third article is offered for free, then the next available number in the reference list becomes 20. Thus, the fourth article ordered will have a probability of 1 in 17.

If p' is the next number in the reference list, then the probability is expressed as $1/(p'-p+1)$. This algorithm can be generalized by taking any reference list, as long as it always respects the probability of $1/n$. The function of probability $1/(p'-p+1)$ can itself be replaced by any other function of p and p'.

The source code of the dynamic probability algorithm is shown in FIG. 5A underneath the highlighted dynamic probability algorithm title.

Figure 12:
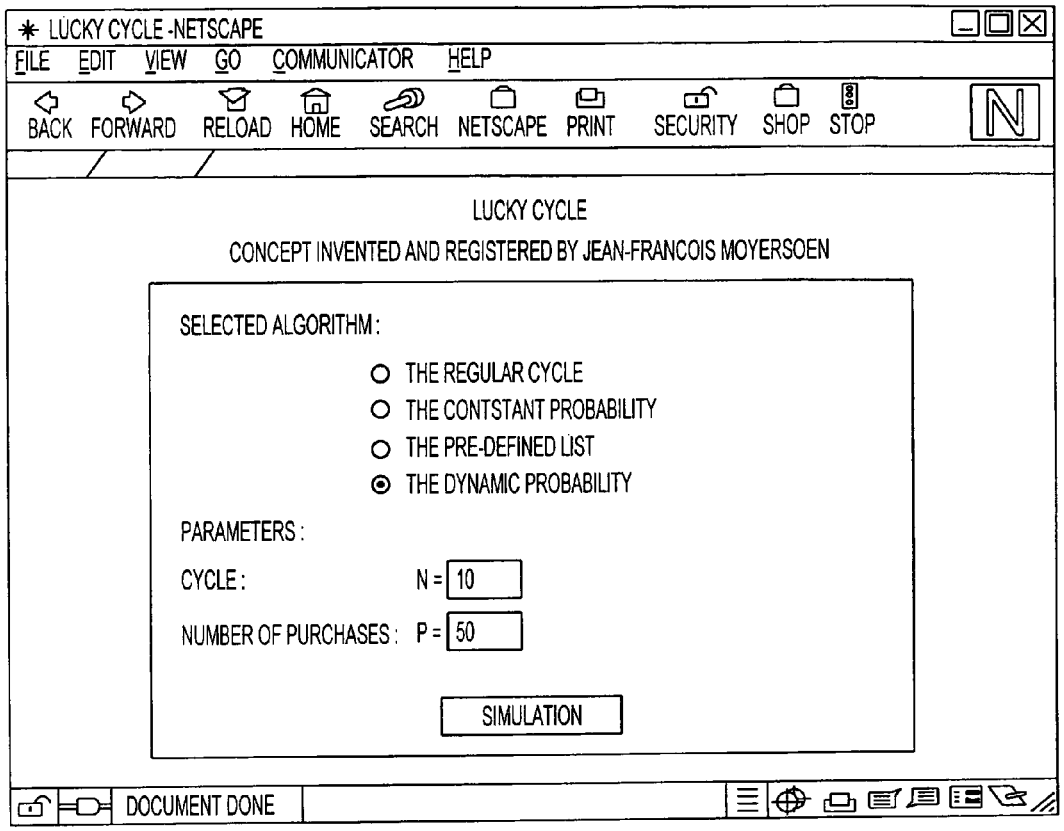
FIG. 12 shows a LUCK(Y)CYCLE management screen where the merchant has selected the dynamic probability algorithm for a particular individual and/or (a) group(s) of product(s) and/or service(s) in the on-line store's catalog.
Figure 13:
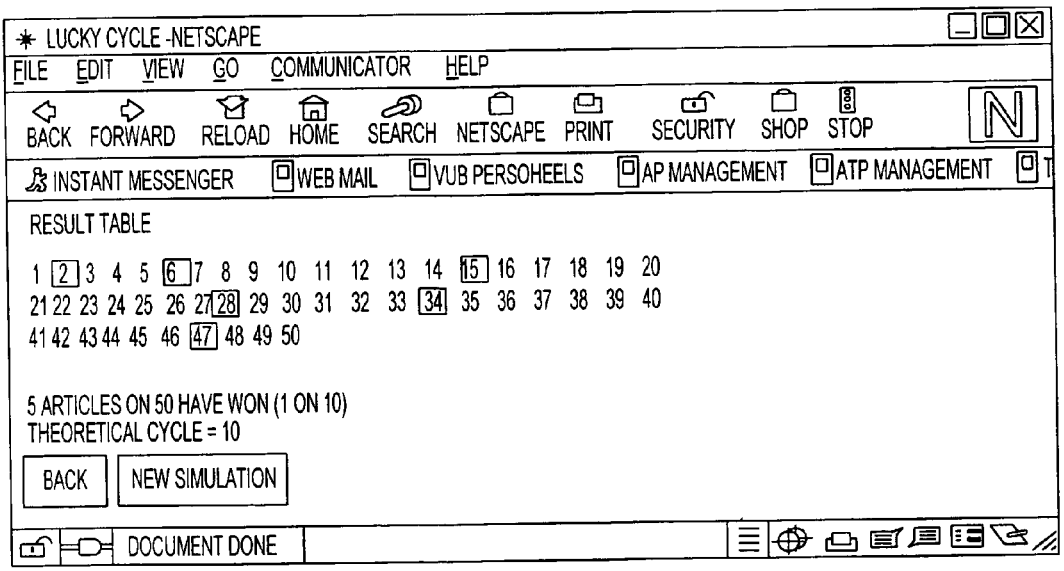
FIG. 13 shows a LUCK(Y)CYCLE result screen showing the individual and/or (a) group(s) of product(s) and/or service(s) offered for free corresponding to the merchant's choice of the dynamic probability algorithm for a particular individual and/or (a) group(s) of product(s) and/or service(s) as shown in FIG. 12.

A screenshot in FIG. 12 shows how the merchant selects this algorithm. FIG. 13 shows the resulting individual and/or group of products and/or services offered for free when n has been set to 10 and p has been set to 50.

It should be understood that where any of the constant probability, pre-defined list, and dynamic probability algorithms require the generation of a random number, that random number need not be an integer within the desired range of values, but may be a rational fraction as well. The fraction could then be rounded to an integer for further use in the algorithm. The use of such fractional values would have the effect of increasing the possible number of random values generated, but it should not have any effect on the probability of any integer being chosen.

What I claim is:

1. A method of selling and purchasing at least one object of purchase from a content provider site over a computer network, said method comprising the following steps:
   a. receiving a request at said site to find said at least one object of purchase, each of said at least one object of purchase having attributed to it a probability of obtaining said each of said at least one object of purchase at no cost to said purchaser, wherein said probability of purchase at no cost to said purchaser is communicated to the purchaser prior to selecting said at least one object for purchase;
   b. selecting receiving a selection of said at least one object of purchase for purchase;
   c. confirming an order for said at least one object of purchase;
   d. determining whether payment must be made for said each of said at least one object of purchase; and
   e. receiving payment for only those objects of purchase from said at least one object of purchase for which payment was determined to be required in step d,
   wherein said step of determining whether payment must be made for said each of said at least one object of purchase comprises the following steps:
   (1) generating a random number between a first predetermined value and a second predetermined value for said each of said at least one object of purchase;
   (2) offering said each of said at least one object of purchase to said purchaser at no cost if said random number is equal to a third predetermined value; and
   (3) requiring payment for said each of said at least one object of purchase if said random number is not equal to said third predetermined value.

2. A method of selling and purchasing at least one object of purchase from a content provider site over a computer network, said method comprising the following steps:
   a. receiving a request at said site to find said at least one object of purchase, each of said at least one object of purchase having attributed to it a probability of obtaining said each of said at least one object of purchase at no cost to said purchaser, wherein said probability of purchase at no cost to said purchaser is communicated to the purchaser prior to selecting said at least one object for purchase;
   b. selecting receiving a selection of said at least one object of purchase for purchase;
   c. confirming an order for said at least one object of purchase;
   d. determining whether payment must be made for said each of said at least one object of purchase; and
   e. receiving payment for only those objects of purchase from said at least one object of purchase for which payment was determined to be required in step d,
   wherein said step of determining whether payment must be made for said each of said at least one object of purchase comprises the following steps:
   (1) determining a series of whole numbers for said each of said at least one object of purchase after a first event selected from the group of events consisting of:
      (i) said site is ready to sell for the first time said each of said at least one object of purchase; and
      (ii) a first predetermined number of said each of said at least one object of purchase have been ordered after a second event selected from the group of events consisting of:
         (a) said site is ready to sell for the first time said each of said at least one object of purchase; and
         (b) determining a series of whole numbers as specified in this step (1), said series of whole numbers being between one and said first predetermined number,
      said series of whole numbers having as many numbers as the integral part of the quotient of said first predetermined number divided by a second predetermined number;
   (2) offering said each of said at least one object of purchase to said purchaser at no cost if the number of said each of said at least one object of purchase ordered since step (1) was last performed is equal to one of said series of whole numbers; and
   (3) requiring payment for said each of said at least one object of purchase if said number of said each of said at least one object of purchase ordered since step (1) was last performed is not equal to any of said series of whole numbers.

3. A method of selling and purchasing at least one object of purchase from a content provider site over a computer network, said method comprising the following steps:
   a. receiving a request at said site to find said at least one object of purchase, each of said at least one object of purchase having attributed to it a probability of obtaining said each of said at least one object of purchase at no cost to said purchaser, wherein said probability of purchase at no cost to said purchaser is communicated to the purchaser prior to selecting said at least one object for purchase;
   b. receiving a selection of said at least one object of purchase for purchase;
   c. confirming an order for said at least one object of purchase;
   d. determining whether payment must be made for said each of said at least one object of purchase; and
   e. receiving payment for only those objects of purchase from said at least one object of purchase for which payment was determined to be required in step d,
   wherein said step of determining whether payment must be made for said each of said at least one object of purchase comprises the following steps:

(1) determining a series of whole numbers for said each of said at least one object of purchase after a first event selected from the group of events consisting of:
  (i) said site is ready to sell for the first time said each of said at least one object of purchase; and
  (ii) a first predetermined number of said each of said at least one object of purchase have been ordered after a second event selected from the group of events consisting of:
    (a) said site is ready to sell for the first time said each of said at least one object of purchase; and
    (b) determining a series of whole numbers as specified in this step (1), said series of whole numbers being between one and said first predetermined number,
  said series of whole numbers having as many numbers as the integral part of the quotient of said first predetermined number divided by a second predetermined number;

(2) generating a random number between zero and a first number of said each of said at least one object of purchase that must be ordered in the future for a second number of said each of said at least one object of purchase ordered since step (1) was last performed to equal the least of said series of whole numbers which is greater than a fourth number of said each of said at least one object of purchase actually ordered since step (1) was last performed, said generation of said random number being performed for said each of said at least one object of purchase;

(3) offering said each of said at least one object of purchase to said purchaser at no cost if said random number is equal to zero; and (4) requiring payment for said each of said at least one object of purchase is said random number is not equal to zero.

* * * * *

UNITED STATES PATENT AND TRADEMARK OFFICE
CERTIFICATE OF CORRECTION

PATENT NO. : 7,139,725 B1 Page 1 of 1
APPLICATION NO. : 09/656299
DATED : November 21, 2006
INVENTOR(S) : Jean-Francois Moyersoen It is certified that error appears in the above-identified patent and that said Letters Patent is hereby corrected as shown below:

On title page, item 76 Inventor
replace "Jean-Francois Moyerson"
with --Jean-Francois MOYERSOEN--.

Signed and Sealed this

Sixth Day of March, 2007

JON W. DUDAS
*Director of the United States Patent and Trademark Office*